April 26, 1960 D. D. O'NEILL 2,934,304
ELECTRO MAGNETIC SCALE
Filed Aug. 30, 1955 2 Sheets-Sheet 1

INVENTOR
Dennis D. O'Neill

April 26, 1960      D. D. O'NEILL      2,934,304
ELECTRO MAGNETIC SCALE

Filed Aug. 30, 1955      2 Sheets-Sheet 2

To B+ Supply

To hot side of A.C.

INVENTOR
Dennis D. O'Neill

United States Patent Office

2,934,304
Patented Apr. 26, 1960

2,934,304

ELECTRO MAGNETIC SCALE

Dennis D. O'Neill, Hinsdale, N.H.

Application August 30, 1955, Serial No. 531,407

1 Claim. (Cl. 249—47)

The present invention relates to improvements in scales.

The present invention relates more particularly to an electro magnetic scale possessing novel and unique properties. My invention differs from any automatic scales known heretofore in that in the prior art scales the material to be weighed is balanced in some manner against a spring or a standard weight. Commonly, one pound of material is balanced against a one pound weight, though, of course, more or less weight may be used as a standard, if a lever is employed.

In prior art arrangements, the beam of necessity undergoes movement during the weighing cycle. It is my purpose to balance the material to be weighed, such material commonly known as a draft, against an electro magnet, solenoid, or coil, hereinafter called a weigh or weighing solenoid. There will be no movement of the scale beam or required movement of the scale beam to accomplish the triggering of the device by using the characteristics of an overloaded alternating current electro magnet.

It is a further object of the invention to trigger certain controls under the influence and control of current which is caused to be drawn in an electro magnet by the load being weighed.

Additional objects of the invention will appear from the following description in which the preferred embodiment of the invention has been set forth in detail in conjunction with the accompanying drawing. Referring to the drawings.

Figure 1:
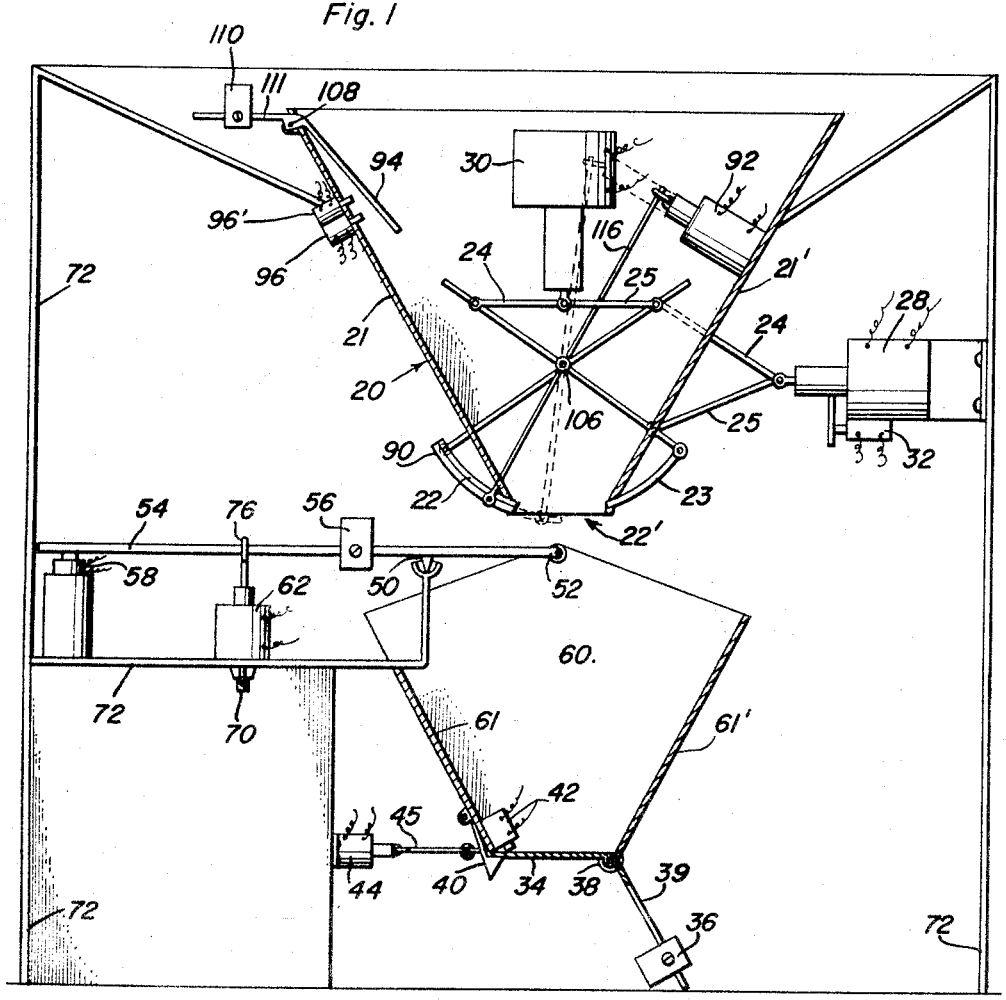
Figure 1 is a cross section through the automatic electro magnetic scale according to the invention showing the weighing hopper in closed position.
Figure 2:
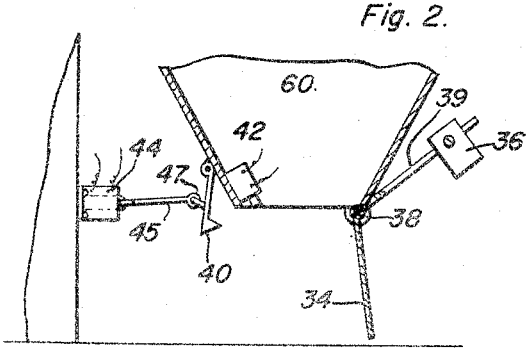
Fig. 2 is a fragmentary cross sectional view corresponding to Fig. 1 but showing the weighing hopper in open position.
Figure 3:
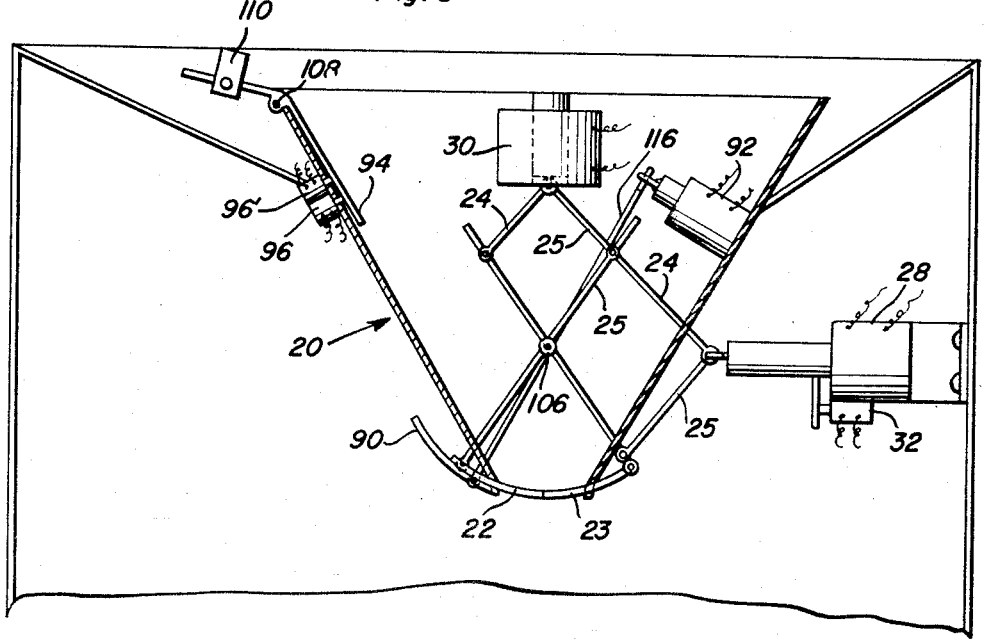
Fig. 3 is a fragmentary cross sectional view corresponding to Fig. 1 but showing the inlet hopper in closed position, rather than in the open position shown in Fig. 1.

I have proved by experiment that a solenoid energized by A.C. when required to hold an ever increasing load will, after a certain point, cause more current to flow in the circuit supplying such solenoid. The increased flow of current is what I am using to trigger the various mechanisms of the scale, without giving rise to any movement of the scale beam, until after the draft is discharged. As will appear hereinafter moreover, the scale is capable of automatically regulating itself to the supply of material which advances to the scale.

Referring to the drawings, the scale consists of an inlet hopper 20, comprising walls 21, 21' and having a bottom opening 22'. Disposed below hopper 20 is a weighing hopper 60 having walls 61, 61' and connected to a scale beam 54 at a pivot point 52. The bottom of hopper 60 is closed by a gate 34 pivoted at 38 and urged into closed position by an extension or bar 39 having thereon an adjustable weight 36. Scale beam 54 is pivoted on a knife-edge pivot 50. A movable weight 56 is provided on beam 54 in order to counterbalance the weight of hopper 60. Any weight contained by hopper 60 is counterbalanced by a weighing solenoid 62, which is movable along scale frame 72 by loosening a thumb screw 70. Solenoid 62 has associated therewith a loop 76 which is movable with solenoid 62 and through which loop the beam 54 extends. When the beam 54 is perfectly balanced, a switch 58 is closed thereby.

It will be observed that weighing hopper 60 is provided with a latch 40 for holding closed the gate 34. A switch 42 is located in such a position with respect to gate 34 that when the latter is closed, the switch 42 is likewise closed. A solenoid 44 is provided for the purpose of releasing the latch 40 through the intermediary of a link 45 connected to the latch by means such as 47 shown.

The opening 22' at the bottom of inlet hopper 20 is closed by inlet gates 22 and 23, which are hinged at 106, and which are operated by solenoids 28 and 30 mounted in any suitable manner on hopper 20. It will be observed that the solenoids 28 and 30 operate the inlet gates 22 and 23 through the intermediary of toggle mechanism 24, 25, by the pulling in of armature 92 when switches 96 are closed and by the falling out when switches 96 are opened.

There is also provided on hopper 20 a speed control baffle 94, hinged at 108, and balanced by a weight 110 disposed upon an extension of baffle 94. Switches 96 and 96' are provided which are operated by baffle 94 when such switches are engaged by baffle 94. Switches 96 and 96' are responsible for controlling the speed control gate 90 through solenoid 92, disposed within the hopper 20, by the pulling in of armature 92 when switches 96 are closed and the falling out when switches 96 are opened.

Figure 4:
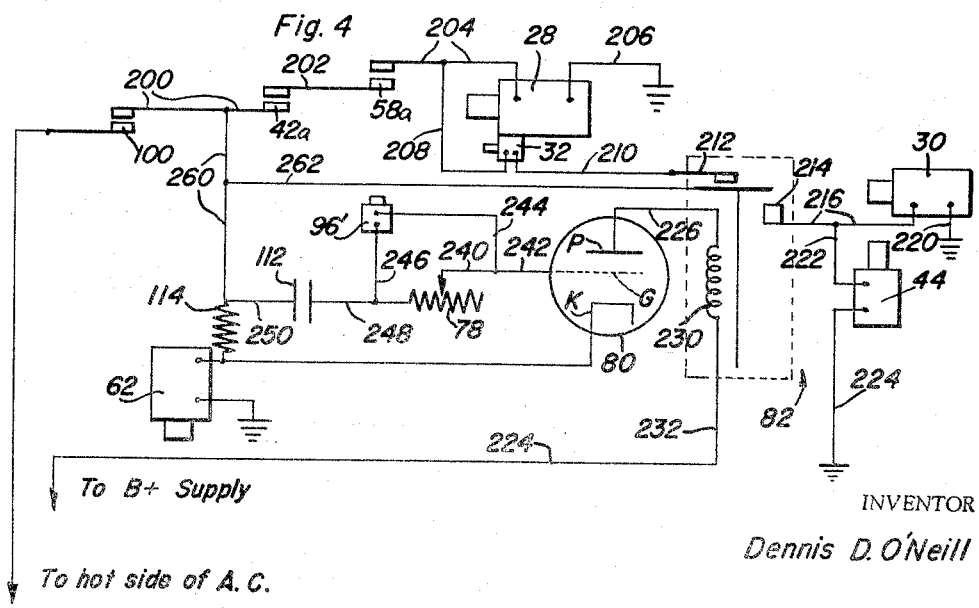
Fig. 4 is a circuit diagram of the controls which bring about the desired operation according to the invention.

In Fig. 4, 100 represents a switch which leads to the hot side of a source of alternating current, one side of which is grounded. When switch 100 is closed, a connection is established from the hot side of the alternating current source through a wire 200 to one of the two contacts of switch 42, the other contact being connected by a wire 202 to one of the two contacts of switch 58, the other contact being connected by a wire 204 to one side of solenoid 28, the other side thereof being connected to ground by means of a lead 206. A wire 208 is connected to lead 204 to one side of switch 32, the other side thereof being connected by means of a wire 210 to a fixed contact 212 of a single pole, double throw relay 82. The other fixed contact 214 of relay 82 is connected by a lead 216 to one side of solenoid 30, the other side of which is grounded by means of a lead 220. One side of solenoid 44 is connected to lead 216 by means of a lead 222, and the other side of solenoid 44 is connected by means of a lead 224 to ground. An electronic tube 80 is provided, which, as illustrated, is a triode having a plate P; a grid G and a cathode K, the plate being connected by means of a lead 226 to the operating coil 230 of relay 82, the other end of the operating coil being connected by means of a lead 232 to a source of B+ voltage. B minus leads to the cathode of tube 80. In the grid cathode circuit of tube 80 there is a potentiometer 78, the movable contact 240 of which is connected by a lead 242 to the grid, and by a lead 244 to one side of switch 96', the other side of said switch being connected by a lead 246 to an end of potentiometer 78. The junction of potentiometer 78 and lead 246 is connected by a wire 248 to one side of a condenser 112, the other side of which is connected by a lead 250 to the upper end of a resistor 114, the lower end of which is connected to one side of weighing solenoid 62, the other side being connected to ground. The upper end of resistor 114 is connected by means of a lead 260 to lead 200. A lead 262 connects from lead 260 then to the movable element of relay 82.

By taking into account material in transit at the feed cut off, the switch 96' causes feed cut off at a lower weight when the gate 90 is fully open so as to allow for the different amount of material in transit when this gate is fully open than when partially closed.

When master switch 100 is closed, it energizes the weighing solenoid 62. It should be kept in mind, of course, that inlet gates 22, 23 are balanced in such a manner that they are normally closed. Moreover, if scale beam 54 is balanced, switch 58 will be closed, as will its contacts 58a. If the discharge gate 34 of hopper 60 is closed, switch 42 as well as its contacts 42a will also be closed. In the foregoing circumstances, energization of solenoid 28 will take place, thereby opening the inlet gates 22, 23, and thereby closing switch 32. Material from inlet hopper 20 will now flow into the weighing hopper 60, stressing beam 54 imperceptably within the loop 76 but adequately to move the beam 54 off of the switch 58, thereby opening contacts 58a. The weight of the material flowing into weighing hopper 60 will be held by weighing solenoid 62 up to a certain point. As more and more current flows through resistor 114, a greater and greater potential drop will develop thereacross, until a point will be reached at which such potential drop, applied in the grid circuit of tube 80, through condenser 112, will cause more plate current to flow in tube 80 energizing relay coil 230. When relay 82 is actuated, this will disconnect the supply holding solenoid 28 closed, through switch 32 and will energize solenoid 30, speeding up the closing of inlet gates 22, 23, also energizing solenoid 44, latch 40 being pulled away from gate 34. The weight of the material in hopper 60 will overcome the weight of the counterbalance 36, thereupon discharging the material into the packaging equipment. The discharging procedure takes the load off of solenoid 62, reducing the current flowing to it, thus lowering the current in tube 80 allowing relay 82 to return to its initial position, thereby opening solenoid 30 and solenoid 44, closing the holding circuit to solenoid 28 through switch 32. Weight 36 overcomes the weight of gate 34, swinging it closed, latch 40 thereupon locking it. This closes switch 42, if scale beam 54 is in balance. Switch 58 will close, thus supplying the pull in current for solenoid 28, starting the cycle over again.

The aforementioned operating principles will be readily apparent to those skilled in the art. In the event that an alternating current solenoid such as that 62 disclosed were required to hold an ever increasing load as would occur upon the opening of gates 22, 23 and an adequate supply of material was contained in the supply hopper 20 or the inlet hopper, a certain point would be reached when the load would tear the armature from the solenoid. This would be considered the maximum ability of the solenoid 62. Thus, when the master switch 100 is closed a small steady flow of alternating current through the resistor 114 and solenoid 62 will flow to ground or to the other side of the alternating current's supply. Any mechanical load such as drawing a draft attached to the armature of the solenoid 62 will cause no change in current until it exceeds a greater amount of the rated capacity. Beyond that point, the armature will chatter with very slight vibrating movements, depending upon the frequency of the current used. However, the solenoid maintains control of the load, such as the scale beam, up to one hundred percent of its rated capacity. The load or scale beam absorbs these vibrations but does not effect movement thereof. Due to its inertia, the beam is unable to follow the vibrations. At the instant these vibrations start due to the overload, there will be an increase in current causing an increased voltage drop across the resistor 114, causing a different potential upon the grid of the tube 80, thus firing it or allowing plate current to flow. This energizes the relay to 30 thereby triggering the scale with no movement of the beam 54. Triggering of the scale closes the gates 22, 23, thereby cutting off the supply and opening gate 34 to discharge the load or draft, thereby taking the mechanical load from the solenoid 62 which automatically decreases the supply current to the solenoid 62 to its original steady value. This decreases the drop across the resistor 114 allowing the grid potential of tube 80 to return to normal, cutting out the plate current and allowing relay 230 to return to its original position. Thus, the contacts 212 are closed and in readiness to start the aforementioned cycle again when the gate 34 closes. The aforementioned action could, with proper adjustment, be delayed until a further increase of chatter and solenoid current occurs, such as is done in the slow speed condition of the scale. There is one movement of the scale beam which could be technically called the drawing of a draft that permits the balance of the weighing hopper to be checked before each and every draft.

When the inlet gates 22, 23 close, there will be suspended in air between them and the material in the weighing hopper 60, a quantity of material to be accounted for. That is the purpose of adjustment 70, so weighing solenoid 62 can be moved along the scale 72 and beam 54 to any point where the pull on solenoid 62 will be such as to make the electronic control explained above work at such instant that the total of what is already in hopper 60 plus the suspended equals the correct weight. Thus, if the combination of 62 plus the electronic controls were set to trigger at two pounds, and it was desired to have each and every draft equal two pounds, solenoid 62 would have to be set so there would be less distance between it and point 50 than between point 50 and point 52.

A scale operating with the inlet gates having two positions opened and closed, will from time to time run into trouble, outdrawing its supply. Therefore, I have had to add a speed regulator. This takes the form of a baffle 94, mentioned above, having a counterweight 110 which swings 94 out towards the center of the hopper 20 when there is a small supply of material in the hopper 20. When hopper 20 is full, it presses on 94 pushing it against switches 96, closing it, thereby energizing solenoid 92, pulling gate 90 through lever 116 back out of the way for full flow fast speed. It also closes switch 96' shunting out potentiometer 78.

When the supply to the scale is small, the material in 20 drops below 94, allowing it to swing out, opening switches 96, 96', cutting the supply to solenoid 92, allowing gate 90, which is weighted to close or to swing partially closed. Switch 96' is opened, which now closes the triggering current to flow to potentiometer 78, which will be adjusted so there will have to be more material in hopper 60 before the scale is triggered. When the speed control gate is in fast flow position, solenoid 62 will be adjusted by continually weighing drafts until the right place along 54 is selected. Now, when gate 90 swings to slow flow position, drafts will be weighed until the correct setting of potentiometer 78 is determined. Thereafter, the weights or drafts will be right, in either position of gate 90.

When gate 90 swings to its closed position, it does not entirely close the opening of hopper 21. This is shown in the drawing. When the gate 90 is in its closed position, it will impede the flow of material from hopper 21 to hopper 60, thus slowing down the rate of the scale. When it is open, it will allow a larger quantity of material to flow, thus speeding up the scale. The amount of material in hopper 60 determines when the electronic trigger operates. Thus, the rate at which the material arrives in the hopper 60 will determine the speed of the scale. Gate 90 is controlled by baffle 94 which in turn is controlled by the supply in the hopper 20. This, in effect, makes the gate 90 a speed control gate responsive to the supply of material in hopper 21. This is not to be confused with a so-called dribble flow. The scale goes through its cycle with either fast or slow flow, or a combination of both, which is controlled by the amount of the load at which chatter begins and full capacity of the solenoid.

In operation, the armature in the solenoid 62 when overloaded or required to hold the load close to the maximum ability of the solenoid, will vibrate (if a source of alternating current is employed) back and forth. Such movement will be so rapid that the scale beam will be unable to follow it. From a mechanical point of view, the beam has thus been described as stationary. The cause of the vibration of the armature is due to the seat of the armature in the solenoid due to the overload. The overload in this case is a predetermined quantity of material in weighing hopper 60. The armature of an alternating current solenoid will become unseated and chatter loudly, causing more current to flow in the coil. When a large proportion of the total amount of pressure or weight necessary to tear the armature from the solenoid is applied, the electronic trigger shunted across the solenoid coil or the resistor in series with the solenoid will, if proper adjustments are included in the electronic trigger, trigger at any point between eighty percent and one hundred percent.

While this specification sets forth a detailed present and preferred construction of the invention, nevertheless in practice such deviations from such detail may be resorted to as do not form a departure from the spirit of the invention as defined by the appended claim.

What is claimed is:

An automatic weigher comprising, in combination, an inlet hopper, an inlet gate for selectively opening and closing said inlet hopper, a toggle mechanism for moving said inlet gate to opened and closed positions, a plurality of solenoids, a first of said solenoids being operable to move said toggle mechanism and inlet gate to opened position, a second of said solenoids being operable to move said toggle mechanism and inlet gate to closed position, hopper level means in said inlet hopper responsive to level of material therein, said means being operable to vary the rate of material flow from said inlet hopper in response to various levels of material therein, a weighing scale beam, a weighing hopper mounted on one end of said scale beam, a weighing solenoid, the core thereof being operably attached to the other end of said scale beam and operable to hold said beam substantially motionless under increasing load in said weighing hopper, a circuit connected to said weighing solenoid and operable in response to a predetermined level of current in said weighing solenoid due to increase of load in said weighing hopper to a desired value to cause said second solenoid to close said inlet gate, an outlet gate on said weighing hopper, means to open said outlet gate at the same time as said inlet gate is closed, means to close said outlet gate upon discharge of the weighing hopper load therethrough, means responsive to the closing of said outlet gate to cause said first solenoid to open said inlet gate, and means responsive to said hopper level means for adjusting the level of current in said circuit at which said second solenoid is operated, whereby change in feed rate and consequent variation in material in transit between the two hoppers is allowed for in cutting off feed to the weighing hopper.

References Cited in the file of this patent
UNITED STATES PATENTS

| | | |
|---|---|---|
| 1,923,745 | Platzer | Aug. 22, 1933 |
| 2,008,305 | Johnson | July 16, 1935 |
| 2,022,659 | Fisher et al. | Dec. 3, 1935 |
| 2,081,367 | Nicolson | May 25, 1937 |
| 2,231,035 | Stevens | Feb. 11, 1941 |
| 2,260,718 | Merrifield | Oct. 28, 1941 |
| 2,314,654 | Merrifield | Mar. 23, 1943 |
| 2,371,040 | Fisher et al. | Mar. 6, 1945 |
| 2,451,891 | Vagim | Oct. 19, 1948 |
| 2,597,831 | Willis | May 20, 1952 |
| 2,602,660 | Shannon | July 8, 1952 |
| 2,624,443 | Voller | Jan. 6, 1953 |
| 2,714,472 | Richardson | Aug. 2, 1955 |